US012427906B2

(12) United States Patent
Harmon et al.

(10) Patent No.: US 12,427,906 B2
(45) Date of Patent: Sep. 30, 2025

(54) VEHICLE INCLUDING CONVERTIBLE WORK STATION

(71) Applicant: Ford Global Technologies, LLC, Dearborn, MI (US)

(72) Inventors: Michael John Harmon, Northville, MI (US); Ryan Mathew Sandor, North Wales, PA (US); Dale F. Jordan, III, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 824 days.

(21) Appl. No.: 17/673,915

(22) Filed: Feb. 17, 2022

(65) Prior Publication Data
US 2023/0256887 A1    Aug. 17, 2023

(51) Int. Cl.
*B60R 9/02* (2006.01)
*B60P 3/14* (2006.01)
*B60R 13/01* (2006.01)

(52) U.S. Cl.
CPC .......... *B60P 3/14* (2013.01); *B60R 9/02* (2013.01); *B60R 13/01* (2013.01); *B60R 2013/016* (2013.01)

(58) Field of Classification Search
CPC ... B60R 11/06; B60R 2011/004; B60R 5/041; B60R 16/03; B62D 33/0273; B62D 33/03; B62D 33/023; B62D 33/027; B60P 3/14
See application file for complete search history.

(56) References Cited

U.S. PATENT DOCUMENTS

| | | | | |
|---|---|---|---|---|
| 6,059,341 | A * | 5/2000 | Jensen | B60P 3/14 292/29 |
| 6,439,634 | B1 * | 8/2002 | Jensen | E05B 83/16 224/403 |
| 8,007,295 | B2 * | 8/2011 | Lin | H01R 25/006 439/131 |
| 9,257,799 | B2 * | 2/2016 | Stubbs | H04M 19/08 |
| 9,333,868 | B2 | 5/2016 | Uchida et al. | |
| 9,468,289 | B2 * | 10/2016 | Sambonet | A47B 13/16 |
| 9,595,790 | B1 | 3/2017 | Cao | |
| 11,130,451 | B2 * | 9/2021 | Viniegra | B60R 11/06 |
| 11,142,072 | B2 * | 10/2021 | Bhat | H01R 13/74 |
| 11,312,310 | B2 * | 4/2022 | Symonds | B62D 33/023 |
| 11,427,265 | B2 * | 8/2022 | Williamson | B62D 33/03 |
| 12,024,130 | B2 * | 7/2024 | Mack | B60R 9/02 |
| 12,030,558 | B2 * | 7/2024 | Aquila | B60R 9/065 |
| 2004/0032190 | A1 * | 2/2004 | Condas | B60R 11/06 312/310 |
| 2010/0206666 | A1 | 8/2010 | Jeeves | |
| 2020/0317057 | A1 * | 10/2020 | Salter | B60L 1/006 |

FOREIGN PATENT DOCUMENTS

JP    5724714 B2    5/2015

* cited by examiner

*Primary Examiner* — Corey N Skurdal
(74) *Attorney, Agent, or Firm* — Vichit Chea; Carlson, Gaskey & Olds, P.C.

(57) ABSTRACT

This disclosure relates to a motor vehicle including a convertible work station. In some aspects, the techniques described herein relate to a motor vehicle, including a bedside panel including a door. The door is rotatable relative to a remainder of the bedside panel between a closed position, in which the door is substantially flush with the remainder of the bedside panel, and an open position. When the door is in the open position, the door provides a worktop and a compartment located interiorly of the bedside panel is accessible.

18 Claims, 6 Drawing Sheets

VEHICLE INCLUDING CONVERTIBLE WORK STATION

TECHNICAL FIELD

This disclosure relates to a motor vehicle including a convertible work station.

BACKGROUND

Some vehicles, such as pickup trucks, include a cargo bed. The cargo bed can be located behind a passenger compartment of the vehicle. A tailgate can enclose a rear, or aft, end of the cargo bed. Users use cargo beds to carry various types of loads and/or cargo.

SUMMARY

In some aspects, the techniques described herein relate to a motor vehicle, including: a bedside panel including a door, wherein the door is rotatable relative to a remainder of the bedside panel between a closed position, in which the door is substantially flush with the remainder of the bedside panel, and an open position, wherein, when the door is in the open position, the door provides a worktop and a compartment located interiorly of the bedside panel is accessible.

In some aspects, the techniques described herein relate to a motor vehicle, wherein the worktop is provided by a surface removably attachable to the door.

In some aspects, the techniques described herein relate to a motor vehicle, wherein the door is configured to rotate substantially 90° between the closed position and the open position.

In some aspects, the techniques described herein relate to a motor vehicle, wherein the door is rotatable about an axis adjacent a bottom edge of the door.

In some aspects, the techniques described herein relate to a motor vehicle, wherein the compartment is between the bedside panel and a cargo bed side wall.

In some aspects, the techniques described herein relate to a motor vehicle, wherein the cargo bed side wall includes a section including perforated hardboard.

In some aspects, the techniques described herein relate to a motor vehicle, wherein: the cargo bed side wall includes a cutout, and a body including a power outlet is arranged within the cutout.

In some aspects, the techniques described herein relate to a motor vehicle, wherein the body is configured to rotate between a first position in which the power outlet faces the compartment and a second position in which the power outlet faces a cargo bed of the motor vehicle.

In some aspects, the techniques described herein relate to a motor vehicle, wherein the body is configured to rotate substantially 180° between the first position and the second position.

In some aspects, the techniques described herein relate to a motor vehicle, wherein: the body is configured to rotate to a third position substantially 90° from the first position and the second position, and when the body is in the third position, the power outlet is accessible from both the compartment and the cargo bed.

In some aspects, the techniques described herein relate to a motor vehicle, wherein the power outlet is one of a plurality of power outlets on a first face of the body.

In some aspects, the techniques described herein relate to a motor vehicle, wherein the motor vehicle is a pickup truck.

In some aspects, the techniques described herein relate to a motor vehicle, including: a panel including a door; a compartment accessible when the door is open; and a body including a power outlet, wherein the body is rotatable between a first position in which the power outlet faces the compartment and a second position in which the power outlet faces a cargo bed of the motor vehicle.

In some aspects, the techniques described herein relate to a motor vehicle, further including: a cargo bed side wall including a cutout; wherein the body is arranged in the cutout.

In some aspects, the techniques described herein relate to a motor vehicle, wherein the body is rotatably mounted to the cargo bed side wall.

In some aspects, the techniques described herein relate to a motor vehicle, wherein the cargo bed side wall includes perforated hardboard adjacent the cutout.

In some aspects, the techniques described herein relate to a motor vehicle, wherein the panel is a bedside panel.

In some aspects, the techniques described herein relate to a motor vehicle, wherein compartment is between the bedside panel and a cargo bed side wall.

In some aspects, the techniques described herein relate to a motor vehicle, wherein, when the door is open, the door provides a worktop.

In some aspects, the techniques described herein relate to a method, including: opening a door formed in a panel of a motor vehicle to access a compartment, wherein, when the door is open, the door provides a worktop adjacent a bottom of the compartment; and rotating a body including a power outlet so that the power outlet faces the compartment.

DETAILED DESCRIPTION

This disclosure relates to a motor vehicle including a convertible work station. Among other benefits, this disclosure facilitates storage of tools and devices, provides convenient access to power, and provides a convenient location for performing various projects and tasks. These and other benefits will be appreciated from the following description.

Figure 1:
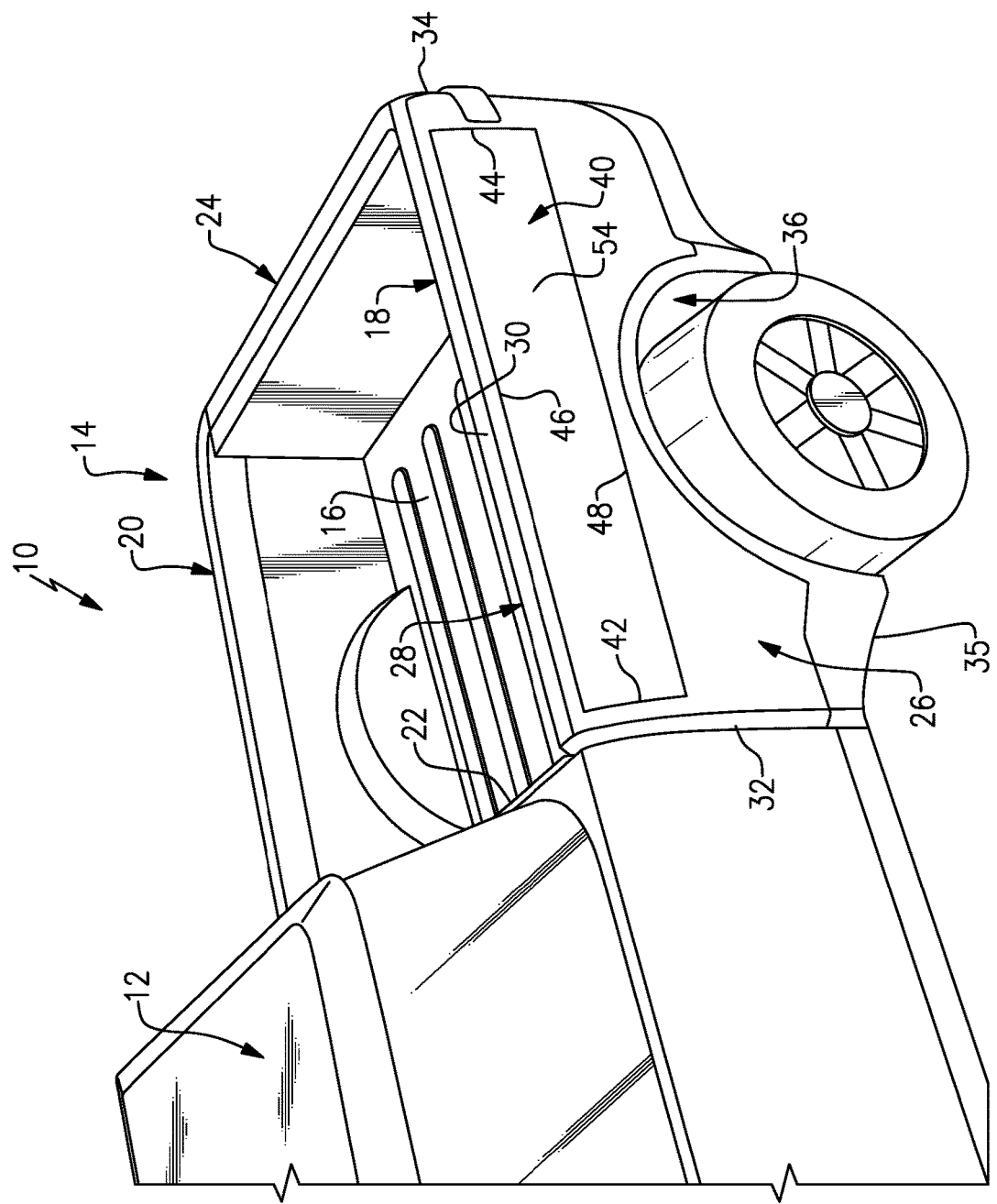
FIG. 1 is a perspective view of a portion of a motor vehicle, which in this example is a pickup truck.

FIG. 1 illustrates a portion of a motor vehicle 10 ("vehicle 10"), which in this example is a pickup truck. While beneficial in the context of pickup trucks, this disclosure could extend to other vehicles besides pickup trucks, such as sport utility vehicles (SUVs), cars, vans, etc. The vehicle 10 can have either a unibody architecture or a body-on-frame architecture, as examples. The vehicle 10 can be an electrified vehicle such as a battery electric vehicle (BEV), plug-in hybrid electric vehicle (PHEV). Alternatively, the vehicle 10 could be a conventional vehicle powered solely or primarily by an internal combustion engine.

The vehicle 10 includes a passenger cabin 12 and, rearward of the passenger cabin 12, a cargo bed 14. The cargo bed 14 is an open-topped cargo area in this example. In other examples, the cargo bed 14 can be closed by a moveable cover, such as a tonneau cover, or a fixed cover, such as a truck cap.

The cargo bed 14 includes bottom surface, or floor 16, a first side 18 extending along a first side of the floor 16, a second side 20 extending along a second side of the floor 16 opposite the first side 18, a front wall 22, and a tailgate 24. In FIG. 1, the tailgate 24 is in a closed position. When in the closed position, the tailgate 24 encloses the cargo bed 14 from the rear. When the tailgate 24 is open, a user may access to the cargo bed 14 from the rear.

Additional detail of the first side 18 will now be described. The second side 20 may be arranged substantially similar to the first side 18. The first side 18 includes a bedside panel 26 mounted to an outer side of a portion of the frame of the vehicle 10. The bedside panel 26 provides an exterior surface of the vehicle 10. The first side 18 also includes cargo bed side wall 28. The bedside panel 26 and the cargo bed side wall 28 are connected at respective top edges by a top rail 30 of the first side 18, in this example. The top rail 30 extends substantially from a location adjacent the front wall 22 to a location adjacent the tailgate 24.

The bedside panel 26 exhibits a length from a front edge 32 adjacent a rear of the passenger cabin 12 to a rear edge 34 adjacent the tailgate 24. Further, the bedside panel 26 exhibits a height between a bottom edge 35 and the top rail 30. The bottom edge 35 is contoured along its length to accommodate a wheel well 36.

In this disclosure, there is a compartment 38 (FIG. 2) between the bedside panel 26 and the cargo bed side wall 28. The compartment 38 is accessible via a door 40 formed in the bedside panel 26, in this example. The compartment 38 has a length between front wall 39 and rear wall 41, and a height between compartment floor 43 and compartment ceiling 45.

With reference to FIG. 1, the door 40, in this example, exhibits a length between a front edge 42 and a rear edge 44, and a height between a top edge 46 and a bottom edge 48. The door 40 is entirely circumscribed by the bedside panel 26. The door 40 is substantially rectangular in this example. The door 40 may be opened either manually, using a handle or similar device, or under the power of one or more actuators in response to a command, as an example.

Figure 2:
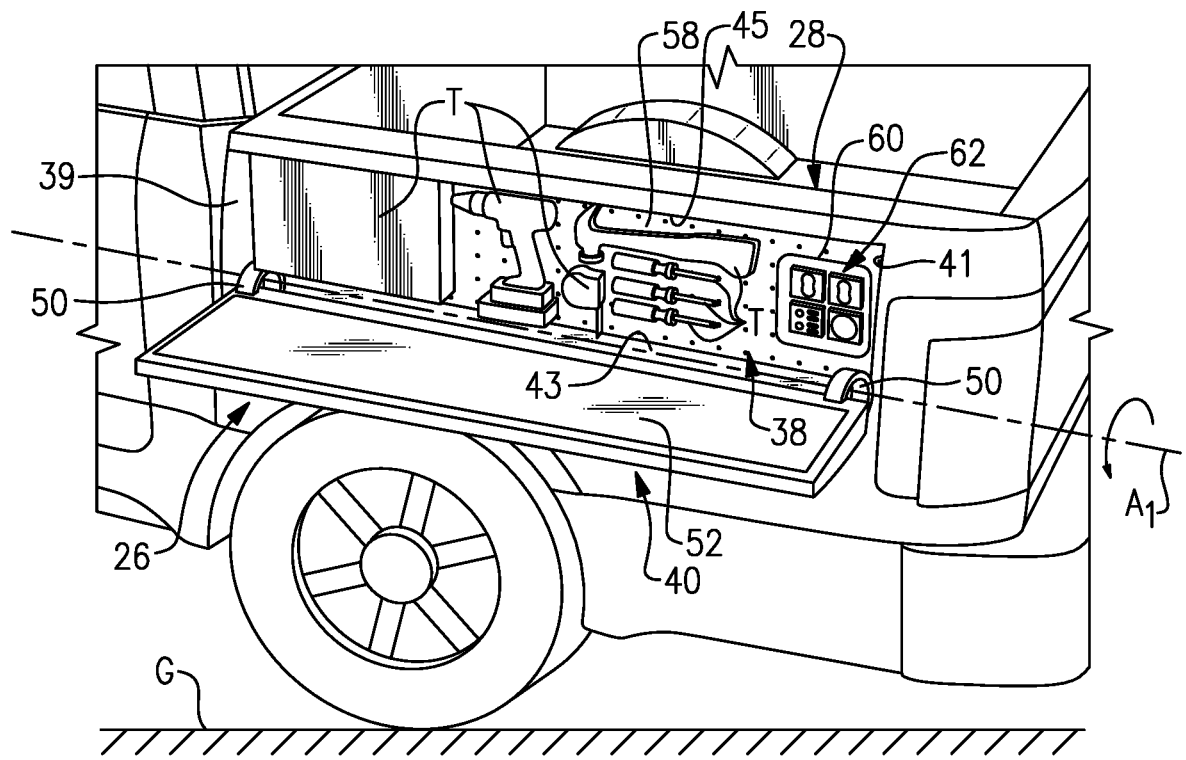
FIG. 2 is view of a portion of the vehicle, and illustrates an example convertible workstation.

With joint reference to FIGS. 1 and 2, the door 40 is rotatable relative to a remainder of the bedside panel 26 between a closed position (FIG. 1) in which the door is substantially flush with the remainder of the bedside panel 26, and an open position (FIG. 2). When closed, the door 40 may be lockable for increased security and may provide an air and water-tight seal relative to the bedside panel 26 to protect the contents of a compartment 38. The door 40 may be deployable and closeable using smartphone activation. In the open position, the compartment 38 is accessible. Further, in the open position, the door 40 provides a worktop. Specifically, the door 40 is rotatable about an axis $A_1$ by hinges 50 mounted adjacent the bottom edge 48 of the door 40. Further, the hinges 50 are configured to stop rotation of the door 40 when the door has rotated about 90° relative to the open position. When in the open position, an inner surface 52 of the door 40, which is opposite the exterior surface 54 of the door 40, is substantially parallel to a ground surface G. When the door 40 is in the open position, the inner surface 52 provides a worktop. The worktop is a substantially flat surface conducive to working and performing various tasks and projects.

Figure 3:
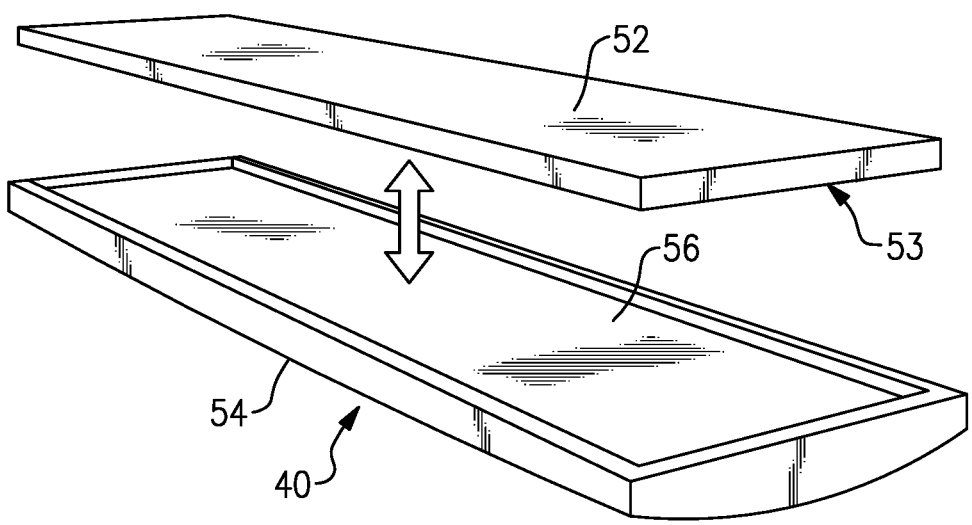
FIG. 3 is an exploded view of an example door, which, when open, provides a worktop of the workstation.

As generally shown in FIG. 3, the inner surface 52 is provided by an insert 53 removably attachable to the remainder of the door 40 using fasteners, for example. The insert 53, and in turn the inner surface 52, can be made of wood, hard plastic, metal, etc. The inner surface 52 may be designed as a wear surface intended to be worn during use. When the inner surface 52 is worn beyond a desired amount, the insert 53 can be replaced. In FIG. 3, the insert 53 is sized to fit into a recess 56 on a side of the door 40 opposite the exterior surface 54 of the door 40.

The cargo bed side wall 28 includes a section including perforated hardboard 58 to facilitate mounting and storage of tools and equipment, as examples, in the compartment 38. In one example, the perforated hardboard 58 is mounted to a surface of the cargo bed side wall 28 facing the compartment 38. In another example, the cargo bed side wall 28 is integrally formed with equally-spaced holes on a surface facing the compartment 38. Regardless, the compartment 38 includes a wall including equally-spaced apart holes configured to receive standard sized pegs, hooks, or other adapters configured to mount and store tools and equipment within the compartment 38. Various example tools T are illustrated in FIG. 2. Having tools accessible adjacent the worktop provided by the door 40 facilitates performing tasks and completing projects. The compartment 38 also permits secure storage of tools T.

Another aspect of this disclosure relates to providing access to power within the compartment 38. In this disclosure, the cargo bed side wall 28 includes a cutout 60. The cutout 60 provides a through-opening between the compartment 38 and the cargo bed 14. In this example, there is a body 62 mounted in the cutout 60. The body 62 is sized and shaped to fit in the cutout 60. Further, the body 62 includes at least one power outlet. The body 62, in this example, is substantially rectangular and provides a mount to supports the power outlet(s).

Figure 4:
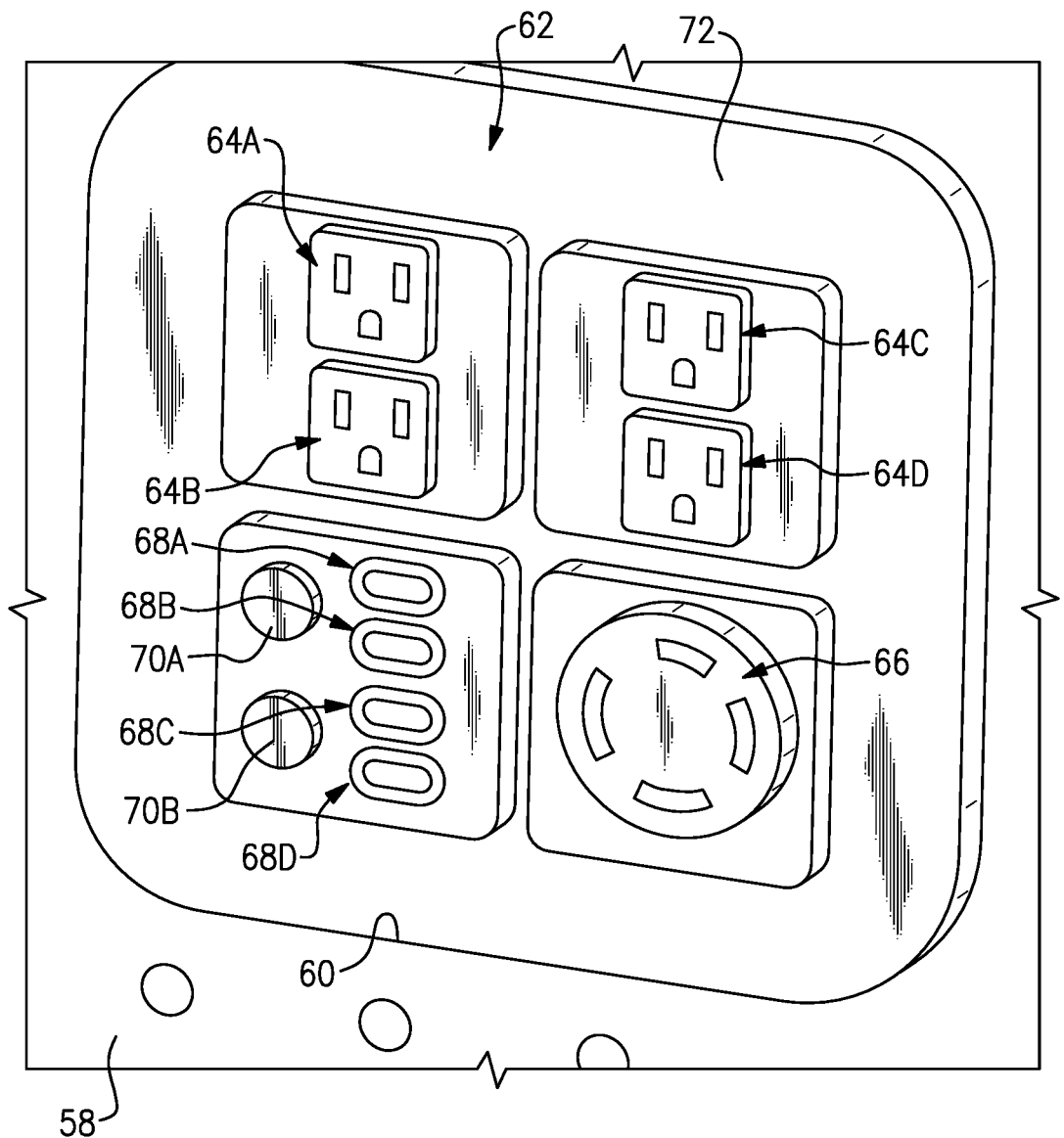
FIG. 4 is a view of an example body including a plurality of power outlets.

As shown in FIG. 4, the body 62 includes a plurality of power outlets of different types. In this example, the body 62 includes four, three-pronged, 120 Volt power outlets 64A-64D. The body 62 also includes a 240 Volt power outlet 66. Finally, the body 62 includes four USB-C outlets 68A-68D and two status lights 70A, 70B. The body 62 includes a bezel 72 surrounding each of the various power outlets. While a particular power outlet arrangement is shown and described, this disclosure extends to other arrangements of power outlets including other types of power outlets. The power outlets can be controlled using smartphone activation.

Figure 5:
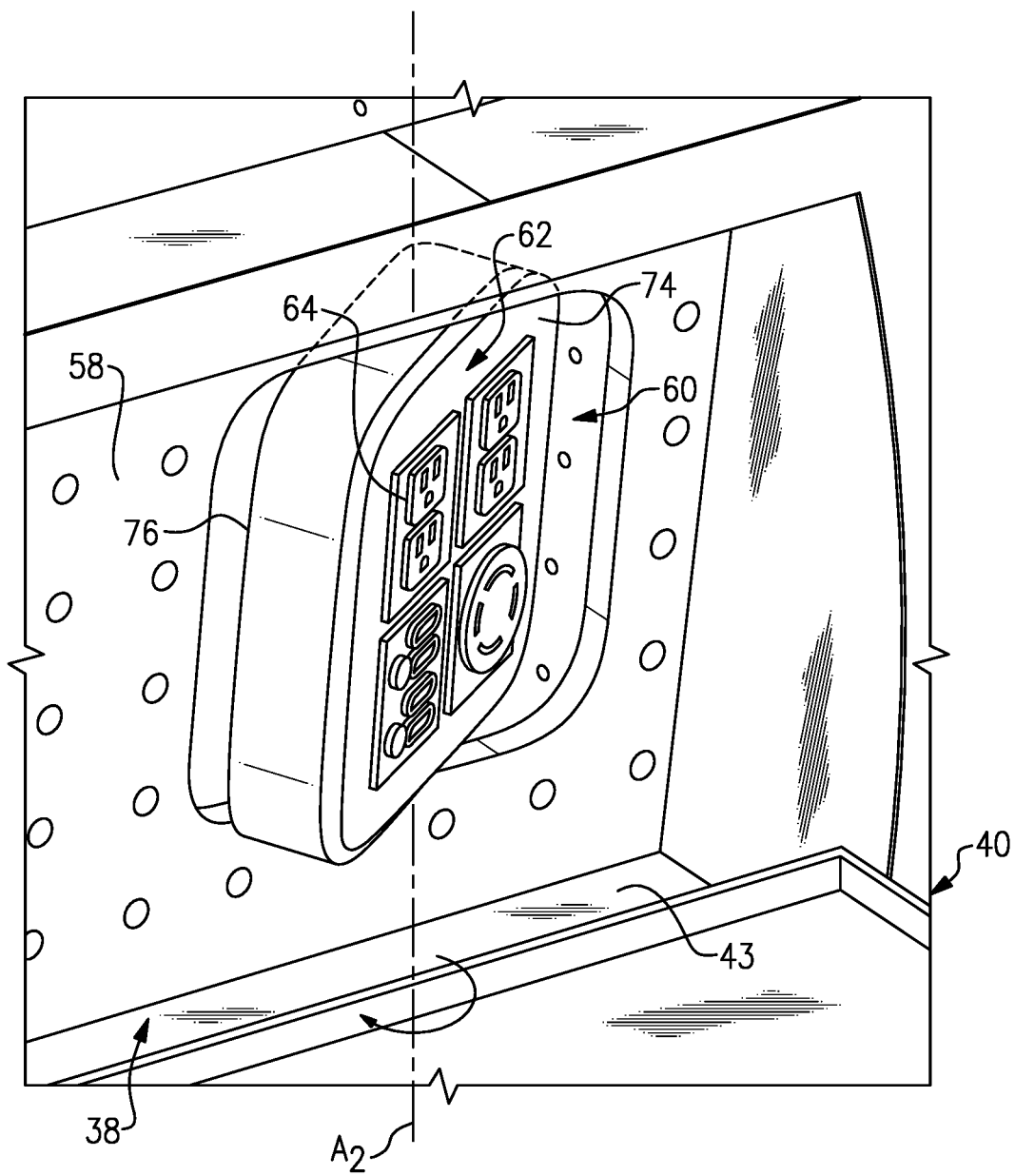
FIG. 5 is a close-up view of a portion of the convertible workstation and shows the body rotated relative to its position in FIG. 2.
Figure 6:
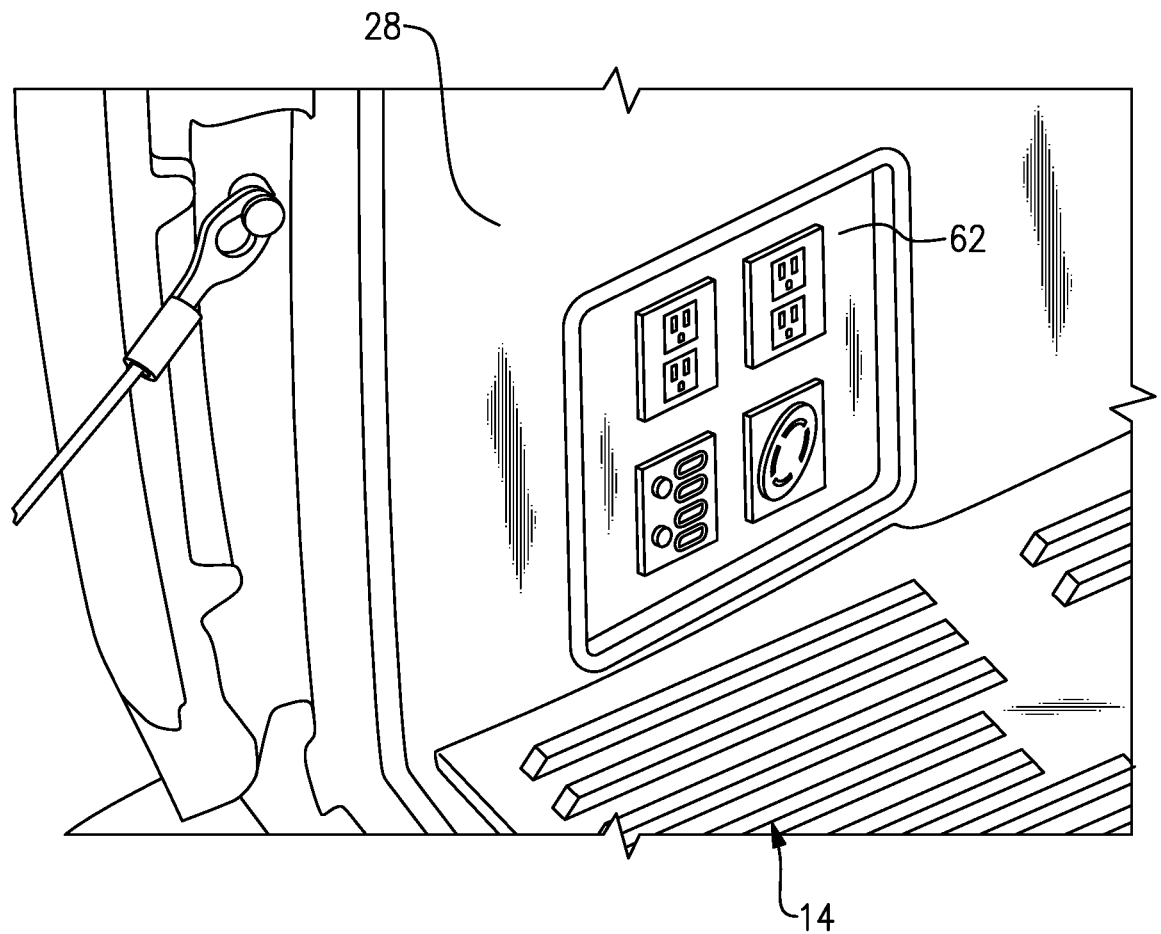
FIG. 6 is a close-up view of a portion of a cargo bed of the vehicle, and illustrates the body rotated to a position in which the power outlets of the body face the cargo bed.

In a further aspect of this disclosure, the body 62 is rotatable. Specifically, the body 62 is rotatable about an axis $A_2$ (FIG. 5) between a first position in which the power outlets face, and are accessible from, the compartment 38 and a second position (FIG. 6) in which the power outlets face, and are accessible from, the cargo bed 14. In this example, only one side of the body 62 includes any power outlets. Specifically, a first side 74 of the body 62 includes power outlets and a second side 76 opposite the first side 74 does not include any power outlets. The second side 76 is a substantially smooth surface in this example.

In this example, the body 62 is rotatable substantially 180° between the first position and the second position. The cargo bed side wall 28 and/or the body 62 may include detents or tabs configured to hold the body 62 in the first and second positions while still permitting a user to selectively move the body 62 to either position by overcoming the resistance of the detents or tabs. In this regard, the body 62 may be moveable about the axis $A_2$ manually by a user or under power using one or more actuators, for example. In an exemplary aspect of this disclosure, the body 62 is automatically rotatable to the first position, such that the power outlets face the compartment 38, when rain is detected, for example. In this manner, interaction between the rain and the power outlet(s) is minimized if not avoided altogether.

In an exemplary aspect of this disclosure, the body 62 may be rotatable only in a first direction about the axis $A_2$ when moving from the first position to the second position. The body 62 may be rotatable from the second position to the first position only in a second direction opposite the first direction. In this way, the body 62 does not freely twist unrestricted about the axis $A_2$, which reduces wear on electrical connections.

In order to prevent ingress of a cargo load from the cargo bed 14, such as dirt, into the power outlet(s), the body 62 can be rotated to the first position, facing the compartment 38, thereby preventing interaction between the power outlet(s) and the cargo load. To this end, the power outlets do not need flaps covering the power outlets. Flaps may be provided in other examples, however. The power outlets can also be rotated to the first position to prevent tampering. Further, by providing power outlets on only one side of the body 62, the number of power outlets on the body is reduced relative to providing separate, dedicated power outlets facing the cargo bed 14 and compartment 38.

Figure 7:
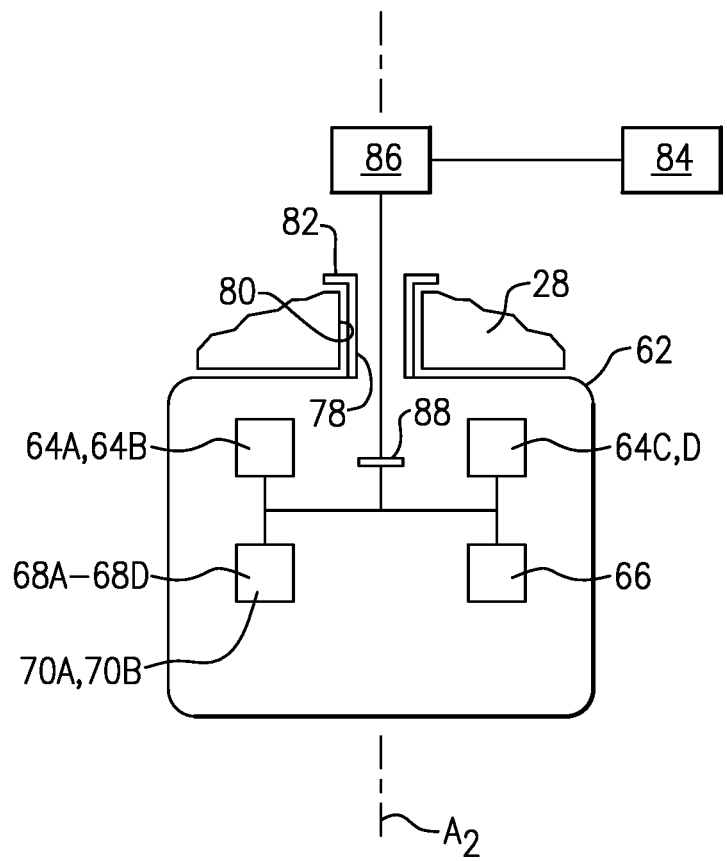
FIG. 7 schematically illustrates mechanical and electrical connections of the body.

FIG. 7 schematically illustrates an example rotatable connection between the body 62 and the cargo bed side wall 28. The rotatable connection, in this example, includes a mechanical connection and an electrical connection. The mechanical connection is provided, in this example, by a projection 78 projecting into an opening 80 of the cargo bed side wall 28. The projection 78 includes a tab 82 that prevents movement of the body 62 along the axis $A_2$ while permitting rotation of the body 62 about the axis $A_2$. In an example, a similar mechanical connection including a projection and a tab projecting through an opening of the cargo bed side wall 28 could be provided adjacent a bottom of the body 62 for additional support.

The body 62, an in particular the power outlets 64A-68D and lights 70A, 70B, are powered by a power source 84. The power source 84 and the power outlets 64A-68D and lights 70A, 70B are in electronic communication with a controller 86. The power source 84 and controller 86 are shown schematically in FIG. 7. The power source 84 could be a traction battery, which powers an electric machine that drives one or more drive wheels of the vehicle 10, or another device configured to supply power. The controller 86 could be part of an overall vehicle control module, such as a vehicle system controller (VSC), or could alternatively be a stand-alone controller separate from the VSC. Further, the controller 86 may be programmed with executable instructions for interfacing with and operating the various components of the vehicle 10. The controller 86 additionally includes a processing unit and non-transitory memory for executing the various control strategies and modes of the vehicle system.

The body 62 may include a slip ring 88 or another types of electromechanical device that allows the transmission of power and electrical signals from a stationary to a rotating structure. While a slip ring 88 is shown, the slip ring 88 could be replaced with another type of rotary electrical interface. Alternatively, a rotary electrical interface is not required.

Figures 8A, 8B, 8C:
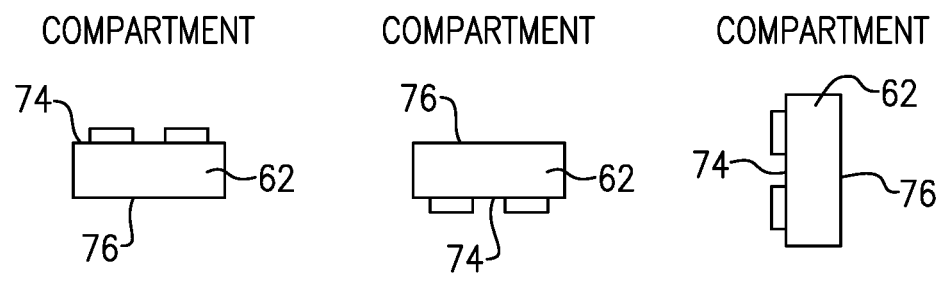
FIG. 8A schematically illustrates the body in a first position in which the power outlets on the body face a compartment, as in FIG. 2.
FIG. 8B schematically illustrates the body in a second position in which the power outlets on the body face the cargo bed, as in FIG. 6.
FIG. 8C schematically illustrates the body in a third position in which the power outlets on the body are accessible from both the compartment and the cargo bed.

FIG. 8A shows the body 62 in the first position. In the first position, the first side 74, and the corresponding power outlets, face the compartment 38. The power outlets can power and/or charge tools or accessories within or adjacent the compartment 38. The tools or accessories can be powered and/or charged while the vehicle 10 is in motion, in one example. FIG. 8B shows the body in the second position. A worker can position the body 62 in the second position, as shown in FIG. 8B, for use in powering tools and/or accessories at a worksite, and can then rotate the body 62 to the first position, shown in FIG. 8A, and secure the tools/accessories into the compartment 38 using the perforated hardboard 58 while also plugging in the tools/accessories for charging while the worker drives to another worksite, for example.

The body 62 could also be useable in a third position substantially halfway between the first and second positions. An example third position is shown schematically in FIG. 8C. In that position, the body 62 is substantially halfway between the first and second positions, and the power outlets are accessible from both the compartment 38 and the cargo bed 14. In the third position, the body 62 is rotated substantially 90° from both the first and second positions.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
  a bedside panel including a door, wherein the door is rotatable about a first axis relative to a remainder of the bedside panel between a closed position, in which the door is substantially flush with the remainder of the bedside panel, and an open position,
  wherein, when the door is in the open position, the door provides a worktop and a compartment located interiorly of the bedside panel is accessible, wherein the compartment is between the bedside panel and a cargo bed side wall, wherein the cargo bed side wall includes a cutout, wherein a body including a power outlet is arranged within the cutout, and wherein the body is configured to rotate about a second axis substantially perpendicular to the first axis between a first position in which the power outlet faces the compartment and a second position in which the power outlet faces a cargo bed of the motor vehicle.

2. The motor vehicle as recited in claim 1, wherein the worktop is provided by a surface removably attachable to the door.

3. The motor vehicle as recited in claim 1, wherein the door is configured to rotate substantially 90° between the closed position and the open position.

4. The motor vehicle as recited in claim 3, wherein the door is rotatable about an axis adjacent a bottom edge of the door.

5. The motor vehicle as recited in claim 1, wherein the cargo bed side wall includes a section including perforated hardboard.

6. The motor vehicle as recited in claim 1, wherein the body is configured to rotate substantially 180° between the first position and the second position.

7. The motor vehicle as recited in claim 6, wherein:
the body is configured to rotate to a third position substantially 90° from the first position and the second position, and
when the body is in the third position, the power outlet is accessible from both the compartment and the cargo bed.

8. The motor vehicle as recited in claim 6, wherein the power outlet is one of a plurality of power outlets on a first face of the body.

9. The motor vehicle as recited in claim 1, wherein the motor vehicle is a pickup truck.

10. The motor vehicle as recited in claim 1, wherein the first axis is substantially parallel to a ground surface adjacent the motor vehicle and the second axis is substantially perpendicular to the ground surface.

11. A motor vehicle, comprising:
a panel including a door;
a compartment accessible when the door is open; and
a body including a power outlet, wherein the body is rotatable between a first position in which the power outlet faces the compartment and a second position in which the power outlet faces a cargo bed of the motor vehicle, wherein the body is configured to rotate substantially 180° between the first position and the second position.

12. The motor vehicle as recited in claim 11, further comprising:
a cargo bed side wall including a cutout;
wherein the body is arranged in the cutout.

13. The motor vehicle as recited in claim 12, wherein the body is rotatably mounted to the cargo bed side wall.

14. The motor vehicle as recited in claim 12, wherein the cargo bed side wall includes perforated hardboard adjacent the cutout.

15. The motor vehicle as recited in claim 11, wherein the panel is a bedside panel.

16. The motor vehicle as recited in claim 15, wherein compartment is between the bedside panel and a cargo bed side wall.

17. The motor vehicle as recited in claim 11, wherein, when the door is open, the door provides a worktop.

18. The motor vehicle as recited in claim 11, wherein the body is rotatable about an axis substantially perpendicular to a ground surface adjacent the motor vehicle.

* * * * *